United States Patent
Clover

(10) Patent No.: US 6,438,924 B1
(45) Date of Patent: Aug. 27, 2002

(54) SLOT FORMING TOOL FOR WALL CONSTRUCTION

(75) Inventor: Thomas J. Clover, 12955 Velp Ave., Green Bay, WI (US) 54313

(73) Assignees: Edward N. Martin, Green Bay, WI (US); Thomas J. Clover, Green Bay, WI (US)

(*) Notice: Subject to any disclaimer, the term of this patent is extended or adjusted under 35 U.S.C. 154(b) by 0 days.

(21) Appl. No.: 09/643,326

(22) Filed: Aug. 22, 2000

(51) Int. Cl.$^7$ ................................ B25F 1/02; B25F 1/04
(52) U.S. Cl. .................... 52/749.1; 52/127.5; 52/127.6; 52/127.9; 52/DIG. 1; 30/134; 30/178
(58) Field of Search ........................ 30/131, 134, 178, 30/179, 229, 233; 83/917; 52/127.5, 127.6, 127.7, 127.9, 127.11, 749.1, DIG. 1

(56) References Cited

U.S. PATENT DOCUMENTS

| | | | | |
|---|---|---|---|---|
| 596,546 A | * | 1/1898 | Runyan | 30/233 |
| 816,279 A | * | 3/1906 | Trogden | 30/293 |
| 1,251,101 A | * | 12/1917 | Quigley | 30/233 |
| 1,307,361 A | | 6/1919 | Kauffman | 30/293 |
| 1,345,882 A | * | 7/1920 | Repass | 30/233 |
| 1,602,169 A | | 10/1926 | Purnell | |
| 2,690,009 A | | 9/1954 | Welk | |
| 3,091,853 A | | 6/1963 | Polayes | |
| 3,159,913 A | * | 12/1964 | Winton | 30/233 |
| 3,372,482 A | | 3/1968 | Mercorelli | |
| 4,106,195 A | * | 8/1978 | Berg | 30/293 |
| 4,177,664 A | | 12/1979 | Spors | |
| 4,446,623 A | | 5/1984 | Stubbersfield | |
| 4,519,135 A | | 5/1985 | LaBounty | |
| 4,543,719 A | | 10/1985 | Pardoe | |
| 4,573,469 A | * | 3/1986 | Golden et al. | 128/334 C |
| RE32,460 E | * | 7/1987 | Leggett, Jr. | 30/363 |
| 4,876,795 A | | 10/1989 | Chun-cheng | |
| 5,230,151 A | * | 7/1993 | Kunzman et al. | 30/134 |
| 5,237,751 A | * | 8/1993 | Moore et al. | 30/200 |
| 5,483,746 A | | 1/1996 | Beyers | |
| 5,619,881 A | | 4/1997 | Morikawa | |
| 5,913,575 A | * | 6/1999 | Lai | 30/229 |
| 6,018,875 A | | 2/2000 | Miranda | |
| 6,049,985 A | * | 4/2000 | Gonzalez et al. | 30/233 |
| 6,070,328 A | * | 6/2000 | Hasegawa | 30/134 |
| 6,092,290 A | * | 7/2000 | Vogelsanger | 30/228 |
| 6,145,203 A | * | 11/2000 | Appleman | 30/233 |
| 6,185,824 B1 | * | 2/2001 | McClure et al. | 30/229 |

FOREIGN PATENT DOCUMENTS

| | | | | |
|---|---|---|---|---|
| DE | 3100998 | * | 7/1982 | 30/134 |
| GB | 972731 | * | 10/1964 | 83/917 |
| NL | 1145849 | * | 3/1963 | 83/917 |

* cited by examiner

*Primary Examiner*—Lanna Mai
*Assistant Examiner*—Phi Dieu Tran A
(74) *Attorney, Agent, or Firm*—Andrus, Sceales, Starke & Sawall, LLP

(57) ABSTRACT

The present invention relates to a slot-forming tool for forming a number of consistently sized and shaped slots in a channel of a wall frame. Each slot aligns and slidingly supports a vertical stud that is snap-fit in place during an intermediate stage of constructing a wall. The tool has an arm for aligning the tool against the channel and a pivotally connected arm that is stroked to form the slot in the channel. Each arm has a gripping portion, an intermediate connecting portion and a working portion. The working portion of the alignment arm includes a cutting block with a face and two spaced sidewalls that form a pair of cutting edges. The working portion of the pivoting arm includes a pair of spaced knives. Each knife has a ramp or wedge shaped blade with a cutting edge that is aligned to shearingly engage one of the cutting edges of the cutting block and slide down the sidewall of the cutting block a predetermined distance. As the pivoting arm is stroked to its closed position, the tool simultaneously cuts two parallel slits and simultaneously forms two roughly perpendicular tears in the channel to form a pair of opposed flaps. The same stroke also bends the flaps inwardly into the channel to form the slot.

29 Claims, 11 Drawing Sheets

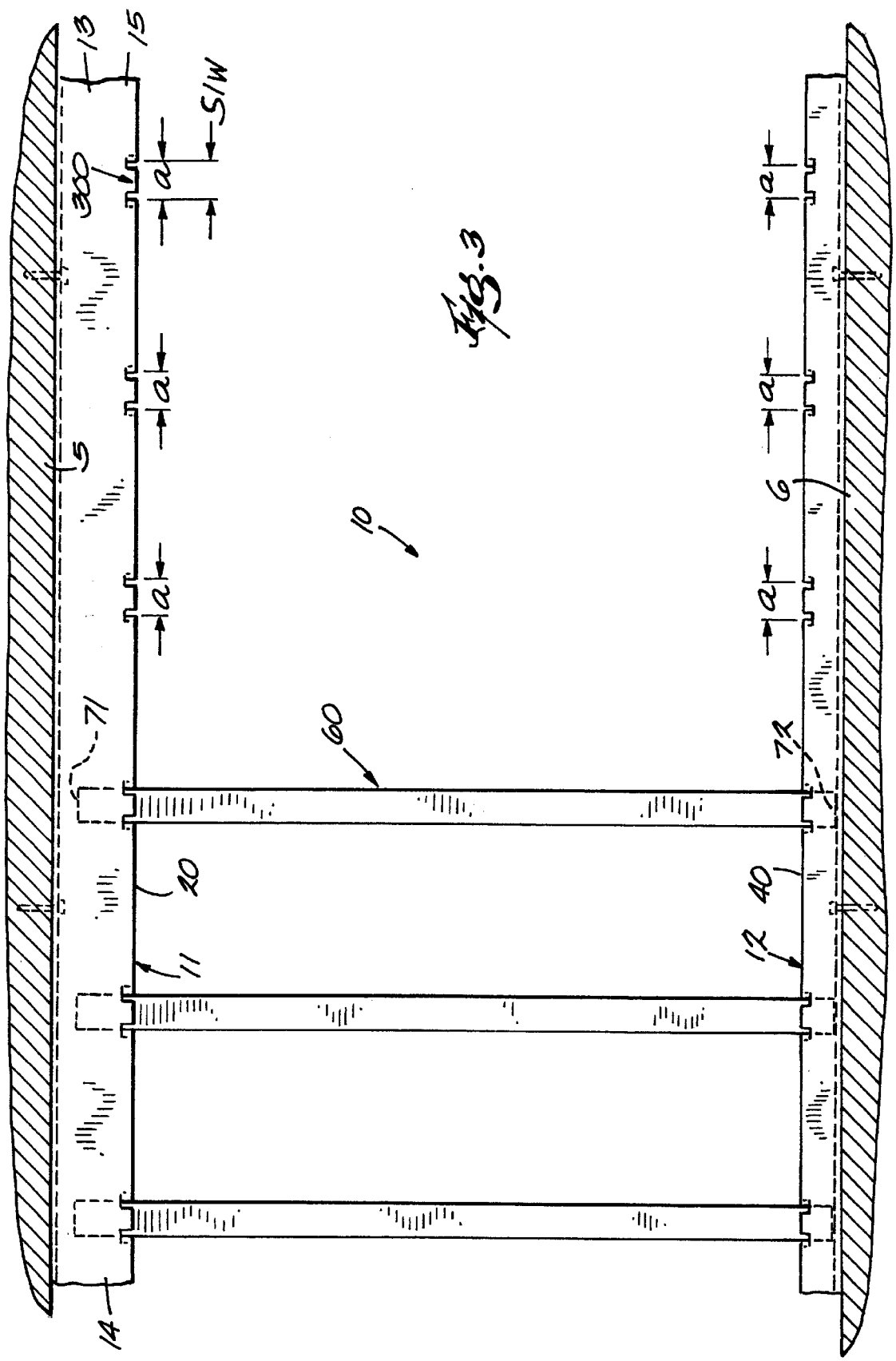

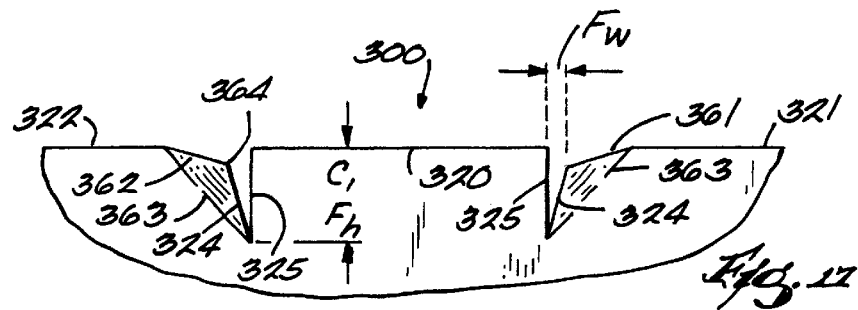
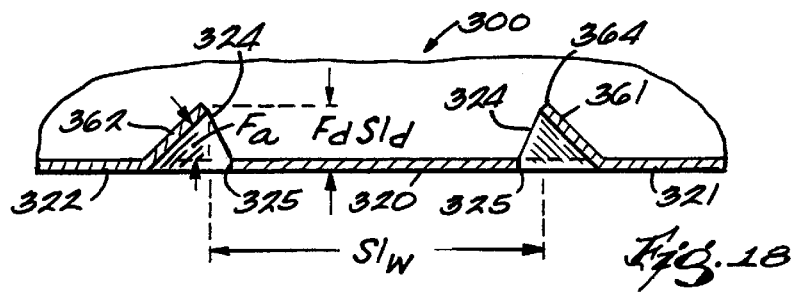
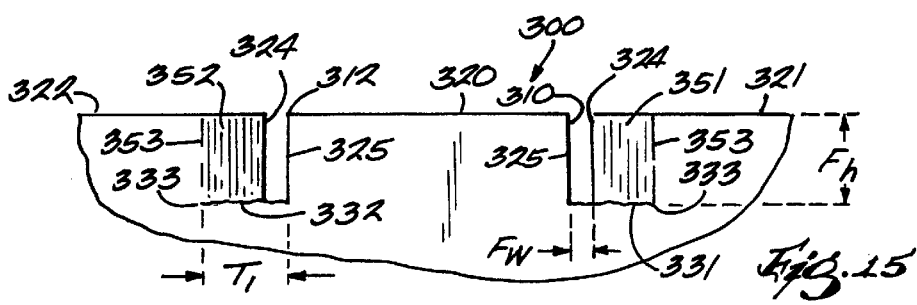
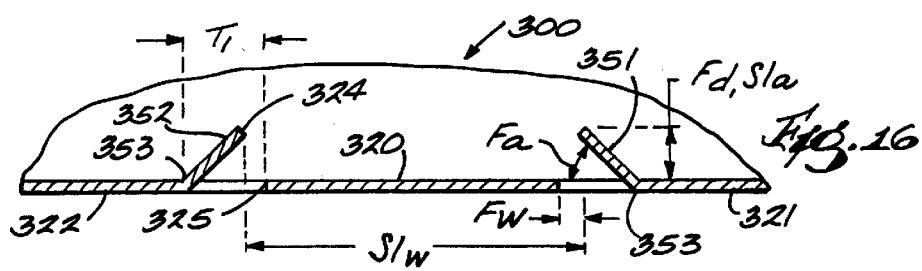
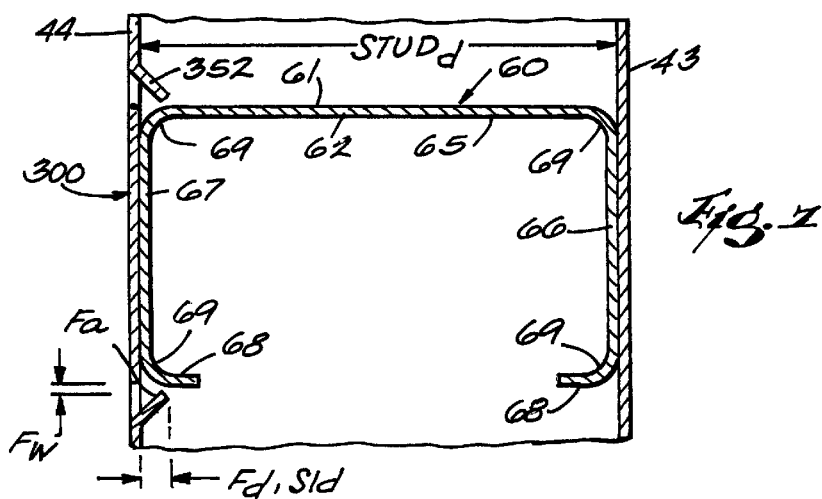

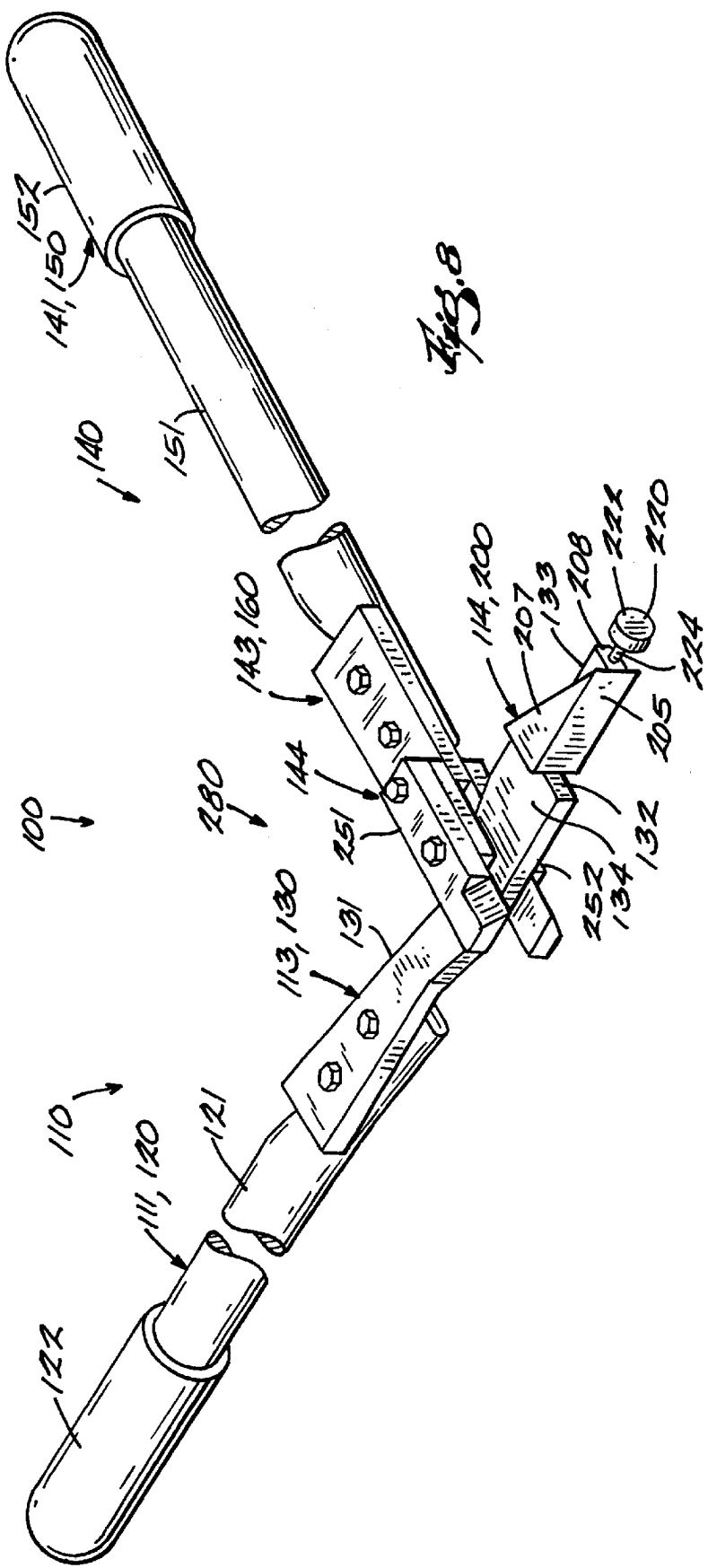

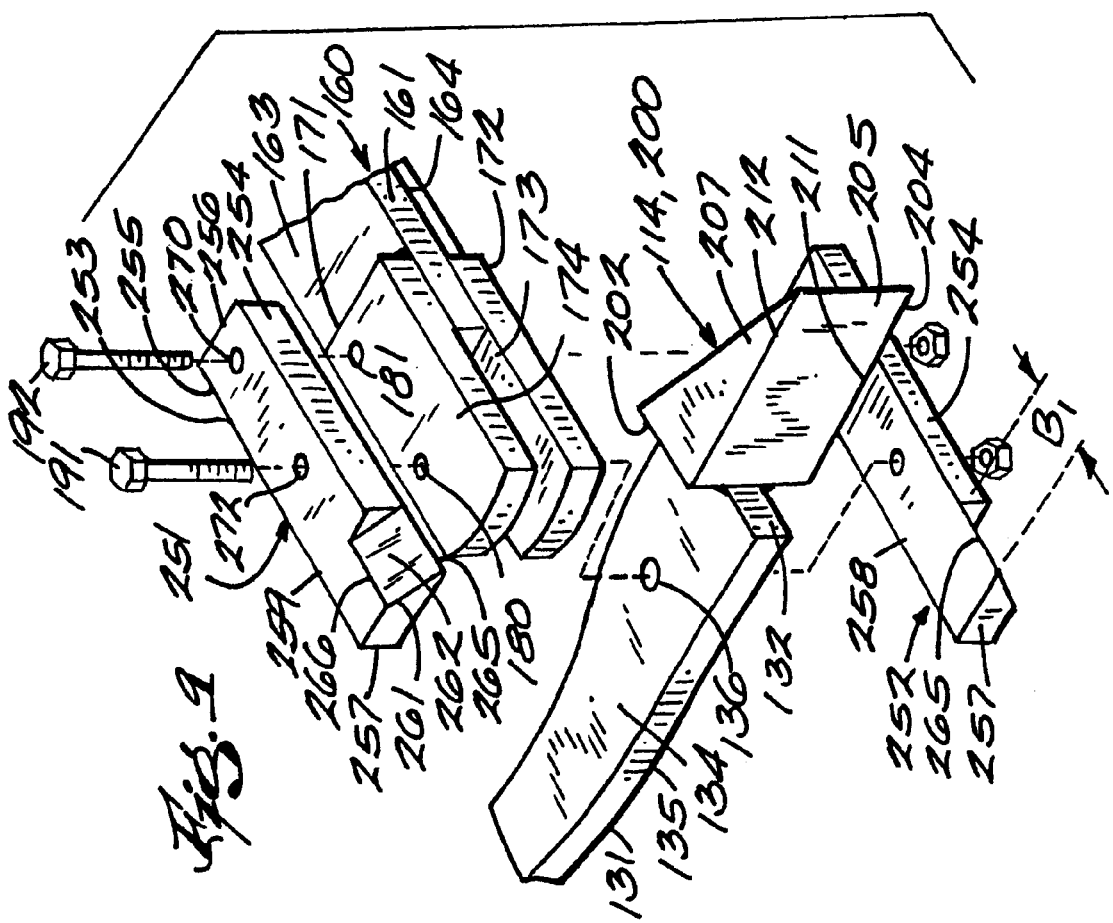

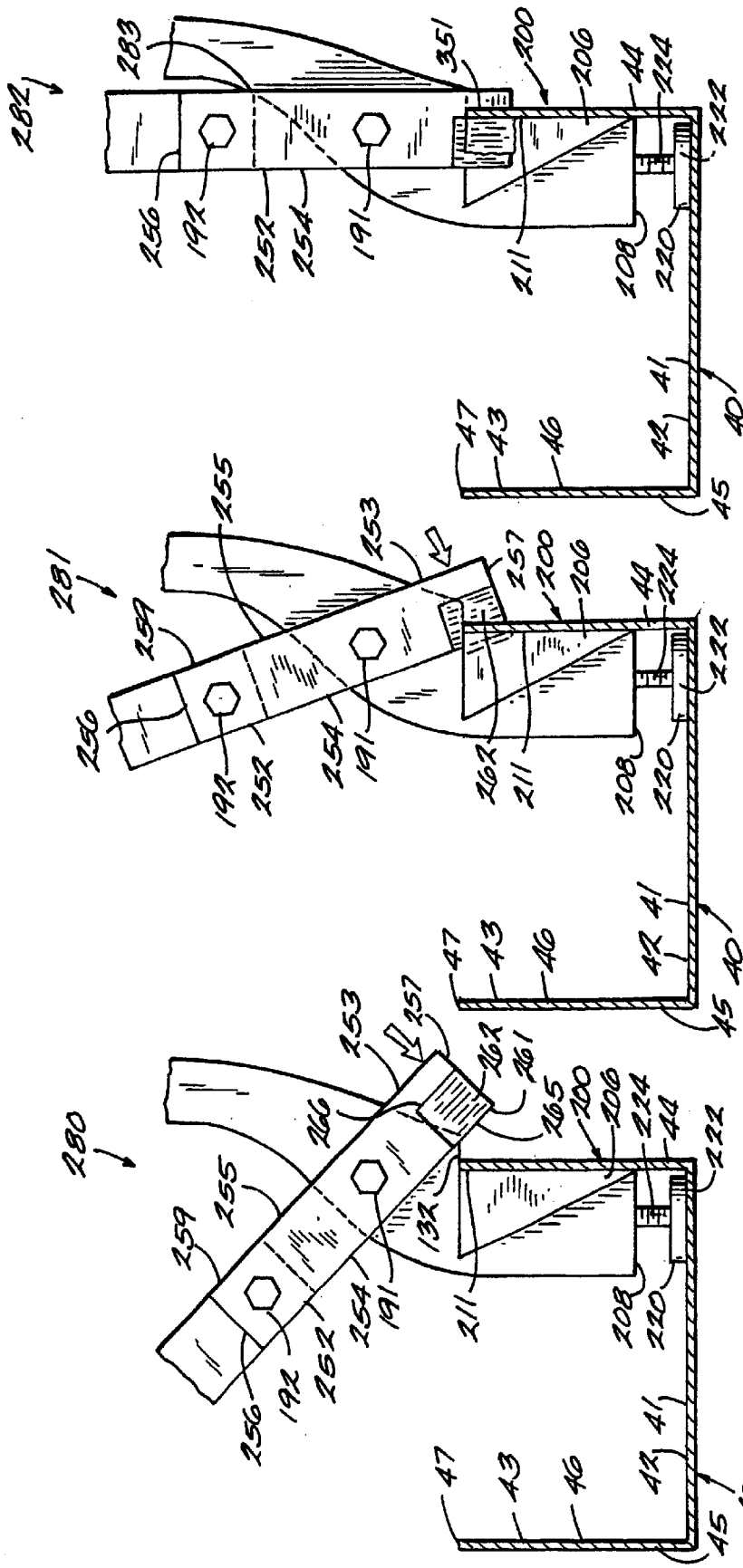

SLOT FORMING TOOL FOR WALL CONSTRUCTION

TECHNICAL FIELD OF THE INVENTION

This invention relates to a slot forming tool that simultaneously forms two opposed flaps In a channel of a wall frame to create a consistently shaped slot for aligning, slidingly receiving and snap fitting a support stud in place during an intermediate stage of construction of the wall frame.

BACKGROUND OF THE INVENTION

Modern building construction techniques use a number of relatively economical components to efficiently form the interior walls of a building. The wall frames typically include fabricated sheet metal components that can be easily cut to length in the field when necessary. As shown in FIG. 1, the frame includes upper and lower U-shaped support channels that are anchored to the ceiling and floor, respectively. The frame also includes a number of hollow C-shaped studs that span between the upper and lower channels at evenly spaced locations down the length of the channels. Once the wall frames are erected, the electrical wiring, plumbing, ventilation ducts, insulation, and other desired components and materials are routed through or placed within the wall frames. Drywall or paneling is then secured to the sides of the wall frames to complete the walls of the building.

The bottom ends of the studs are typically bolted or otherwise rigidly secured to the lower channel. However, in many wall constructions, the top end of the studs are not rigidly secured to the upper channel. The upper channel is anchored to the ceiling, but is not designed to rest on the studs. This type of construction enables the ceiling to move vertically or "float" above the wall. When the ceiling flexes do to an increase in load, such as by adding equipment, people or snow, the ceiling will not compress, crush or buckle the studs, drywall, paneling or other components and materials forming the wall.

During the construction of the interior walls, the wall frames are first erected to an intermediate stage of construction. During this interim stage, the upper and lower channels are anchored to the ceiling and floor, respectively, and the ends of the studs are fixed to the channels. The ends of the studs may be fixed to the channel via friction, as the studs and channels are about the same width, or the studs may be screwed or riveted to the channels at their desired locations. Electrical conduit and outlets, plumbing, heating and ventilation ducts, are then routed throughout the rooms of the building. Each stud includes one or more knockouts to allow these components to be easily routed through the stud and the wall frame. As shown in FIG. 1, the construction personnel performing this work can inadvertently bump or intentionally move the studs from their intended positions. If the studs are screwed or riveted in place, they are difficult to move and may be bent by the workers. Before the wall is completed, the fasteners securing the studs to the upper channel must be removed. If the studs are simply held in place by friction, the workers can easily move them, but the workers must take the time to realign the studs into their intended evenly spaced positions.

The acoustical or thermal insulation is then packed into the wall frame. This packed insulation will maintain the spacing and alignment of the upper end of the studs even though they are not rigidly secured to the upper channel. Once this insulation is installed, it is difficult to reposition the support studs if they are out of their desired vertical, evenly spaced positions. The electrical, plumbing and duct work will invariably result in the necessary repositioning of some studs. Still, many studs are left out of their desired position because the workers cannot easily realign them. Packing insulation between the studs can also move the studs out of position. The quick pace of modern building construction and the division of tasks aggravate this problem, so that no person or group of workers is responsible for maintaining the alignment of the studs. The end result is that the studs are often left out of place and are difficult to locate once the drywall or paneling is installed.

A problem with temporarily riveting or screwing the studs to the upper channel to maintain the desired stud alignment is that these fasteners need to be removed before the drywall or paneling is mounted to the wall frame. This is a time consuming and monotonous task. Workers can easily forget to remove one or more of the hundreds of fasteners securing the studs to the upper channel throughout the building. The wall frame is then improperly fixed to the ceiling, which can crush or buckle the studs, drywall, paneling or other wall components.

Many architects and contractors specify that slots be formed in the upper channels to align the studs without fastening them to the upper channel during the intermediate stage of construction, as shown in FIG. 2. For reasons discussed below, the bottom ends of the studs remain secured to the lower channel via friction, rivets or screws. Each slot is formed by two inwardly bent folds that abut the sides of the stud to retain the stud in its desired position. Because the studs and channel are about the same width, each stud is twisted axially to allow it to snap-fit into its corresponding slot. The twisting causes the open side of the C-shaped stud to compress so that that it will clear one of the inwardly bent folds. The studs are removed the same way. The ability to simply twist the studs to insert or remove them renders their installation or removal a relatively quick and easy task. Should an electrician, plumber or duct worker bump or temporarily move a stud out of position while performing his or her work, the worker can easily reposition the stud into its slot at the desired location. A slot having a width that is ⅛ inch larger than the width of the slot will produce this snap-fit, without causing the stud to bind with the upper channel when the wall is complete.

A problem with using slots to align and hold the studs in a wall frame is that hundreds of slots must be individually formed by hand at the construction site. Each slot requires two cuts at spaced locations to form separate vertical slits. The worker must also inwardly bend the channel to form each fold. To achieve a rectangular fold, the worker must also cut or tear the sheet metal horizontally at the end of each slit, as shown in FIG. 2a. Accordingly, these slots are labor intensive and costly to form.

Another problem with conventional slot forming methods is that the slots are inconsistently sized and shaped. Hand forming each slot produces inconsistencies in slot width and fold shape. These inconsistencies inhibit the formation of each slot to ensure that each stud properly snap-fits in place. The slits are often cut at varying distances apart, and some slits are inevitably cut angled out of vertical so that they are not parallel. The folds will also have different widths depending on where the worker grips the channel with the pliers relative to the slit. The folds are also bent to different angles relative to the rest of the channel. The result is a lack of uniformity in fold geometry and slot width. Slots often have different slot widths, such as widths a, b and c, as shown in FIG. 2. One slot is too narrow, while another is too wide. Yet, a narrow slot will not receive a stud, or it will hold the stud too tightly so that it cannot be easily inserted or removed. Narrow slots can also cause the studs to bind against the upper channel during use, which can damage the stud and wall. A slot that is too wide will not properly retain the stud, so that the stud can fall out or be easily bumped out of its slot.

A further problem is that the slits are not made to a consistent length or depth. Slits that are too long will unnecessarily weaken the channel. Slits that are too short will create folds that are not strong enough to retain the stud.

A still further problem with forming the slots is that at least two different hand tools are needed to create each slot. First, a cutting tool is used to cut the sides of the channel at the desired locations for the two slits. Once the slits are cut, a second hand tool such as a pair of pliers is used to bend and tear the channel to form two inwardly bent folds. The worker must pick up, use, and put down each tool hundreds of times. If the worker makes all the slits first and later comes back to bend each of the folds, the worker must retrace his or her path through the entire building. This effectively doubles the amount of work they must perform.

A still further problem in forming slots into the channel is that conventional bending tools, such as a pair of pliers, do not enable a worker to easily bend and tear the folds to a consistent shape or geometry. A conventional pair of pliers has no guide to align and grip the sheet metal a specific distance from an adjacent slit. As a result, some folds are wider than others. A conventional pair of pliers also has no guide to enable the worker to correctly tear the channel to form a rectangular fold having a specific width, or bend the fold to a consistent angle relative to the vertical side of the channel. Accordingly, the shape or geometry of the folds and the width of the slots will vary.

A still further problem in forming the slots is that they are not efficiently formed by conventional cutting and bending tools. The worker must first align the cutting tool perpendicular to the vertical side of the channel, and then cut the side to an appropriate depth. The desired distance between the cuts of each slot must be measured prior to making the second cut. The worker must then pick up a bending tool to form the folds. The folds must be shaped to the same desired geometry and bent to the same desired angle. These steps must be repeated several hundred times. Each step takes time, and adds to the cost of the wall.

A still further problem with many conventional cutting tools is that they are difficult to use to cut the metal channel. A tool with small handles will require a great deal of hand strength to make the cuts in thicker gauge channels. A worker can become fatigued making the hundreds of cuts needed to form the channels throughout the building, particularly for thicker gauge channels, and can lead to inconsistencies in the formation of the slots. Yet, a tool with long handles can be unwieldy, especially when the slots are being formed in an upper channel several feet above the worker. The worker can easily crush the channel when aligning or stroking the tool, particularly for thinner gauge channels.

A still further problem with many conventional cutting tools is that their blades will quickly dull when cutting thicker gauge channels. The cutting blades cannot be easily removed and replaced with sharp blades. Instead, the entire tool must be set aside for sharpening or discarded. Thus, the costs associated with using these types of cutting tools is needlessly inflated.

The present invention is intended to solve these and other problems.

BRIEF DESCRIPTION OF THE PREFERRED EMBODIMENT

The present invention relates to a slot-forming tool for forming a number of consistently sized and shaped slots in a channel of a wall frame. Each slot aligns and slidingly supports a vertical stud that is snap-fit in place during an intermediate stage of constructing a wall. The tool has an arm for aligning the tool against the channel and a pivotally connected arm that is stroked to form the slot in the channel. Each arm has a gripping portion, an intermediate connecting portion and a working portion. The working portion of the alignment arm includes a cutting block with a face and two spaced sidewalls that form a pair of cutting edges. The working portion of the pivoting arm includes a pair of spaced knives. Each knife has a ramp or wedge shaped blade with a cutting edge that is aligned to shearingly engage one of the cutting edges of the cutting block and slide down the sidewall of the cutting block a predetermined distance. During use, the arms are pivoted apart to an open position to align the cutting block with the channel where a slot is to be formed. As the pivoting arm is stroked to its closed position, the tool simultaneously cuts two parallel slits and simultaneously forms two roughly perpendicular tears in the channel to form a pair of opposed flaps. The same stroke also bends the flaps inwardly into the channel to form the slot. Each stroke of the tool creates one consistently sized and shaped slot for receiving a stud via a snap-fit. Because the upper track channel of many wall frames are designed to remain free to move vertically or "float" with respect to the studs, the slots and flaps must be sized and shaped so that the flaps do not bind against the stud. The flaps can be formed to a number of shapes, such as a rectangular or triangular shape to accommodate a particular design.

An advantage of the slot forming tool of the present invention is that it allows workers to properly and consistently form slots in the channels of a wall frame to align and slidingly support the studs during an intermediate stage of constructing a wall. A single stroke of the tool completely forms each slot. During each stroke, the tool cuts, tears and bends the channel to properly form the two spaced flaps that give the slot its size and shape. Each of the hundreds of slots is properly and consistently formed because the tool does each task in a single stroke. The slots eliminate the time consuming and monotonous task of installing and removing screws or rivets from the upper channel. The tool properly cuts and forms each slot so that binding between the studs and the upper track is avoided. The ceiling remains free to flex without crushing or buckling the studs, drywall, paneling or other wall components during the life of the building.

Another advantage of the slot forming tool is that it is adjustable to form differently shaped slots. The tool can be set to form flaps with different shapes, such as a rectangular or triangular shape. The adjustability of the alignment mechanism, blade angle and thickness and stop point of the closed position give the tool the ability to form customized slots for a particular wall construction or building design.

A further advantage of the slot forming tool is that it forms consistently sized and shaped slots. Once the tool is adjusted to produce a specific slot geometry, the tool forms each slot to that same geometry. Each slot has the same width and flap shape to achieve a proper snap-fit with each stroke of the tool. Parallel slits are cut equidistantly apart each time. The tool has an alignment mechanism that abuts the channel to properly position the cutting blades so that each flap has the desired geometry. The properly formed slots slidingly retain the studs, so that they will not fall out or be easily bumped out of their slot, and they will not bind against the upper channel during use.

A still further advantage of the slot forming tool is that it consistently cuts vertical slits down the side of a channel to a desired length or depth. The slits are correctly sized to avoid unnecessary weakening of the channel while creating flaps that are strong enough to retain the stud.

A still further advantage of the slot forming tool of the present invention is that only one tool is needed to form each slot. The workers do not need to go through the inefficient and monotonous task of picking up, using and putting down several tools each time a slot is formed. Instead, a single stroke of the slot forming tool completely forms a slot, thereby dramatically decreasing the amount of work that a worker must perform to create the hundreds of slots throughout a building.

A still further advantage of the slot forming tool is that a worker can easily bend and tear the folds to a consistent shape and geometry. The slot forming tool has a set closed position. When the tool is stroked to this closed position, the ramp shaped blades cut, tear and bend the channel so that each flap is inwardly bent a desired distance from the remaining portion of the channel. As a result, the shape or geometry of each flap and the width of each slot is constant.

A still further advantage of the slot forming tool is that the slots are efficiently formed. The worker uses the alignment mechanism to align the cutting block against the sidewall of the channel. The alignment mechanism ensures that the ramped blades are consistently aligned to a desired depth down the sidewall of the channel. The alignment mechanism positions the tool against the base of the channel without crushing the sidewall of the channel. The worker then simply strokes the tool to form the slot. A single stroke forms each slot. Accordingly, the tool can efficiently produce the hundreds of slots needed to assembly the various wall frames throughout the building.

A still further advantage of the slot forming tool of the present invention is that it is easy to use to cut thick and thin gauge metal channels. The arms of the slot forming tool are sufficiently long to enable a worker to form the slots with only modest amount of hand and arm strength. The tool is also symmetrically designed to produce a balanced feel that is particularly helpful when the tool is held overhead to form slots in the upper channel of a wall frame. This design allows a worker to easily form hundreds of slots in the channels throughout the building without fatigue and without damaging the channels. The tool provides a better working environment for the workers and enables them to produce better quality work.

A still further advantage with the slot forming tool of the present invention is that the ramped blades can be quickly replaced when they become dull, or to adjust the tool to form a different slot size or geometry. The blades can be quickly and easily removed and replaced at the job site. The tool does not need to be set aside for sharpening or discarded when the blades become dull. Accordingly, the costs associated with the tool are kept to a minimum.

Other aspects and advantages of the invention will become apparent upon making reference to the specification, claims and drawings.

BRIEF DESCRIPTION OF THE DRAWINGS

FIG. 3 is a side view of a wall frame including upper and lower channels and a number of studs positioned in slots formed by the present slot forming tool invention.

FIG. 7 is a top sectional view of the channel with a round corner stud in place.

FIG. 8 is a perspective view of the slot forming tool showing the arms and their corresponding cutting block and blades in an open position.

FIG. 9 is an exploded view of the working and coupling portions of the slot forming tool showing the two knives positioned on a fork-shaped connector that is aligned to receive and be pivotally joined to a plate-shaped connector.

FIG. 12 is a side sectional view of FIG. 11 showing the tool in its open position just prior to cutting two spaced apart, parallel slits in the vertical wall of the channel.

FIG. 13 is a side sectional view of the slot forming tool showing the blades at a point where the cutting of the slits is complete and the tearing of the channel to form rectangular flaps begins.

FIG. 14 is a side sectional view showing the slot forming tool in its closed position with the blades at a point where the tearing and bending of the flaps and formation of the slot is complete.

FIG. 15 is a side view of the vertical portion of the channel showing a channel with rectangular shaped flaps.

FIG. 16 is a top view of FIG. 15 showing the channel cut, torn and bent to form rectangular shaped flaps.

FIG. 17 is a side view of the vertical portion of the channel showing a channel with triangular shaped flaps.

FIG. 18 is a top view of FIG. 17 showing the channel cut and bent to form triangular shaped flaps.

DETAILED DESCRIPTION OF THE PREFERRED EMBODIMENTS

Figure 1:
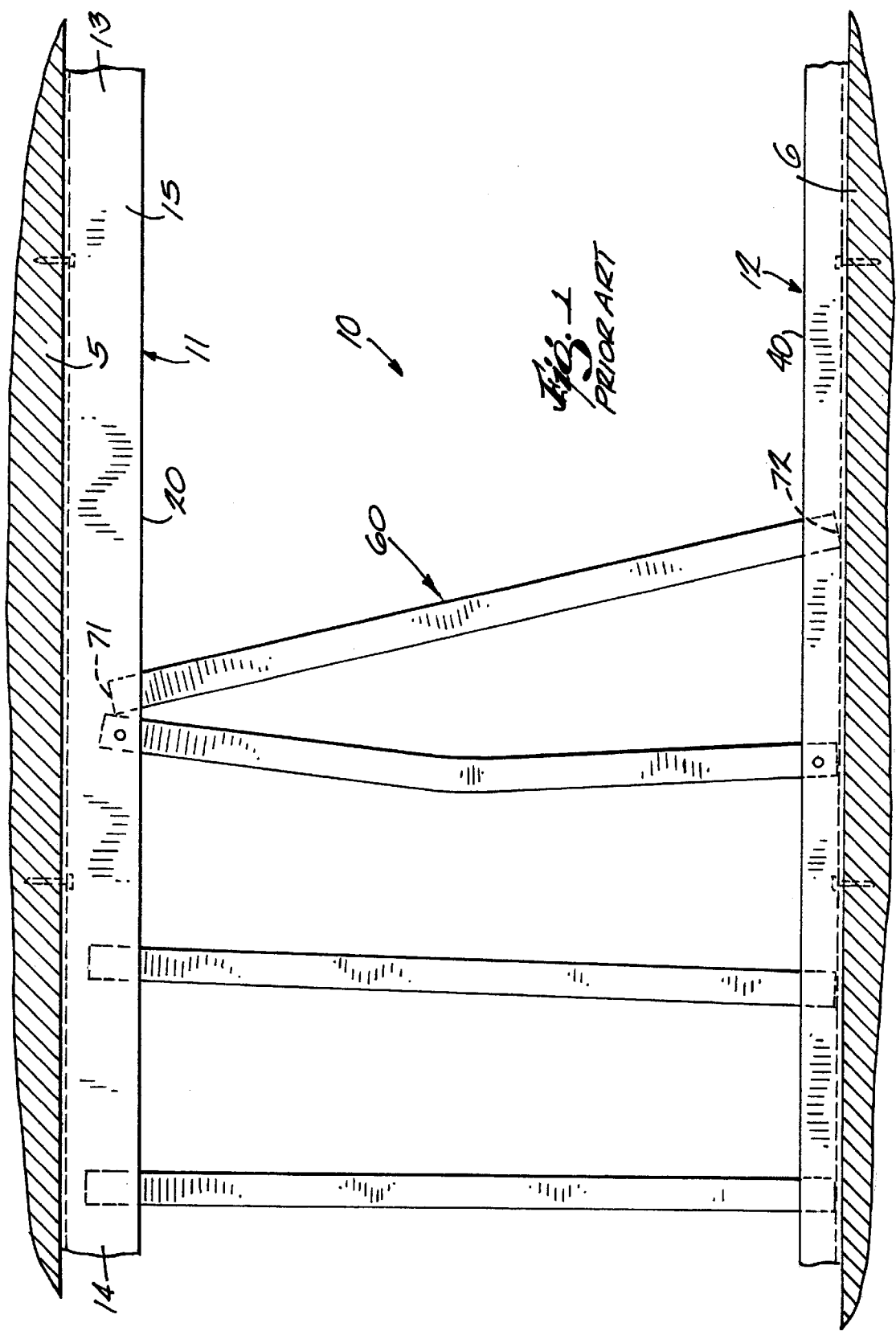
FIG. 1 is a side view of a conventional wall frame including upper and lower channels and a number of studs held in place by friction or screws.
Figures 2, 2A:
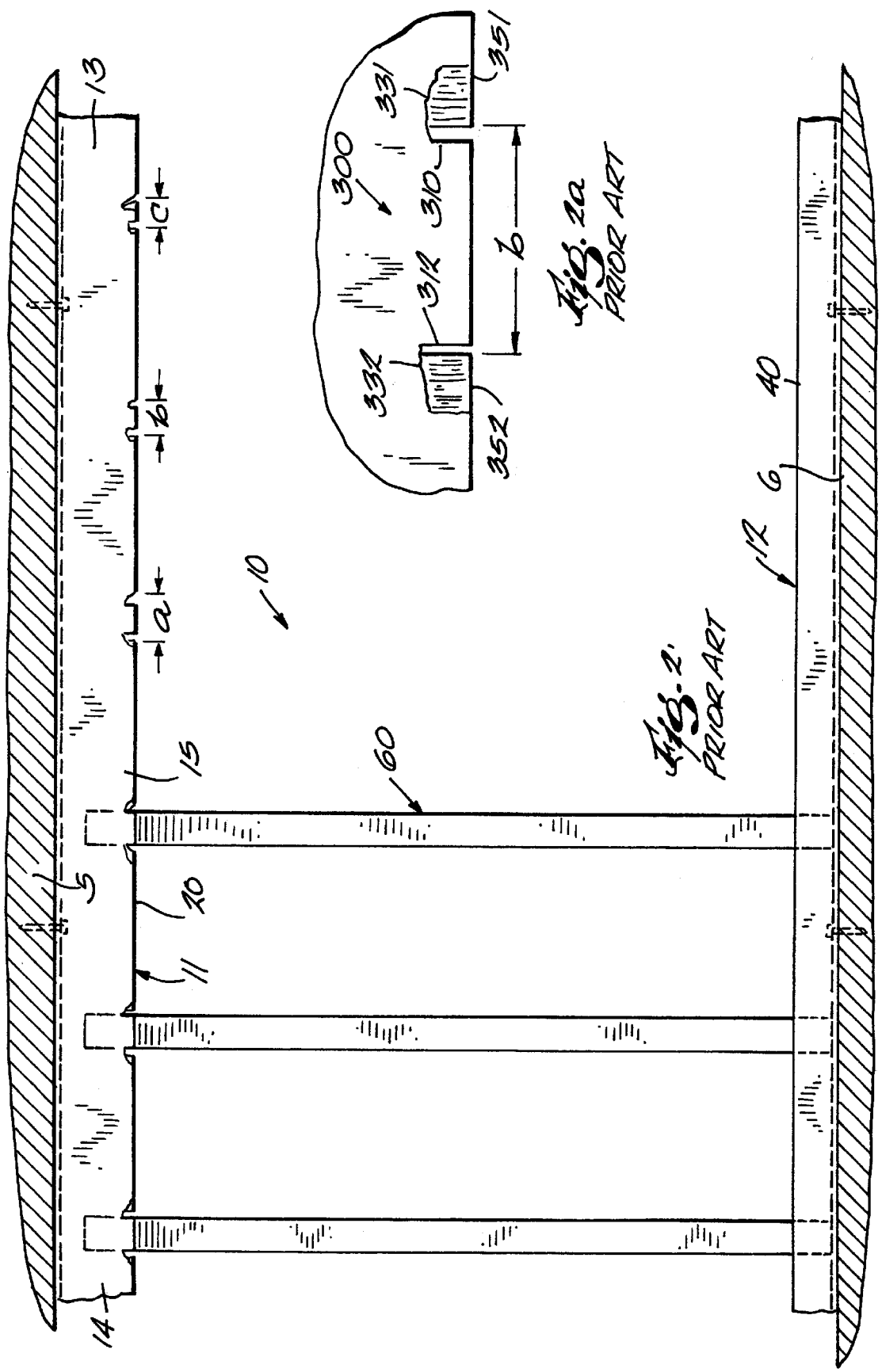
FIG. 2 is a side view of a conventional wall frame with the studs positioned in the upper channel by slots formed by conventional tools.
FIG. 2a is an enlarged view of a slot formed by conventional tools.

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

The invention relates to a tool for construction buildings, and more particularly to a tool for constructing a wall positioned between a ceiling 5 and a floor 6. The wall includes a frame 10 that is first constructed to an intermediate stage as shown in FIG. 3. The frame 10 has upper and lower ends 11 and 12, sides 13 and 14, and front and rear surface 15 and 16. Electrical conduit, plumbing and ductwork are then routed through the frame 10, and acoustical or thermal insulation is added. Once these internal components are installed, the wall is completed by mounting the drywall or paneling to the frame 10. The wall frame 10 is for a wall where the ceiling 5 is free to move vertically or "float" with respect to the wall.

Figure 4:
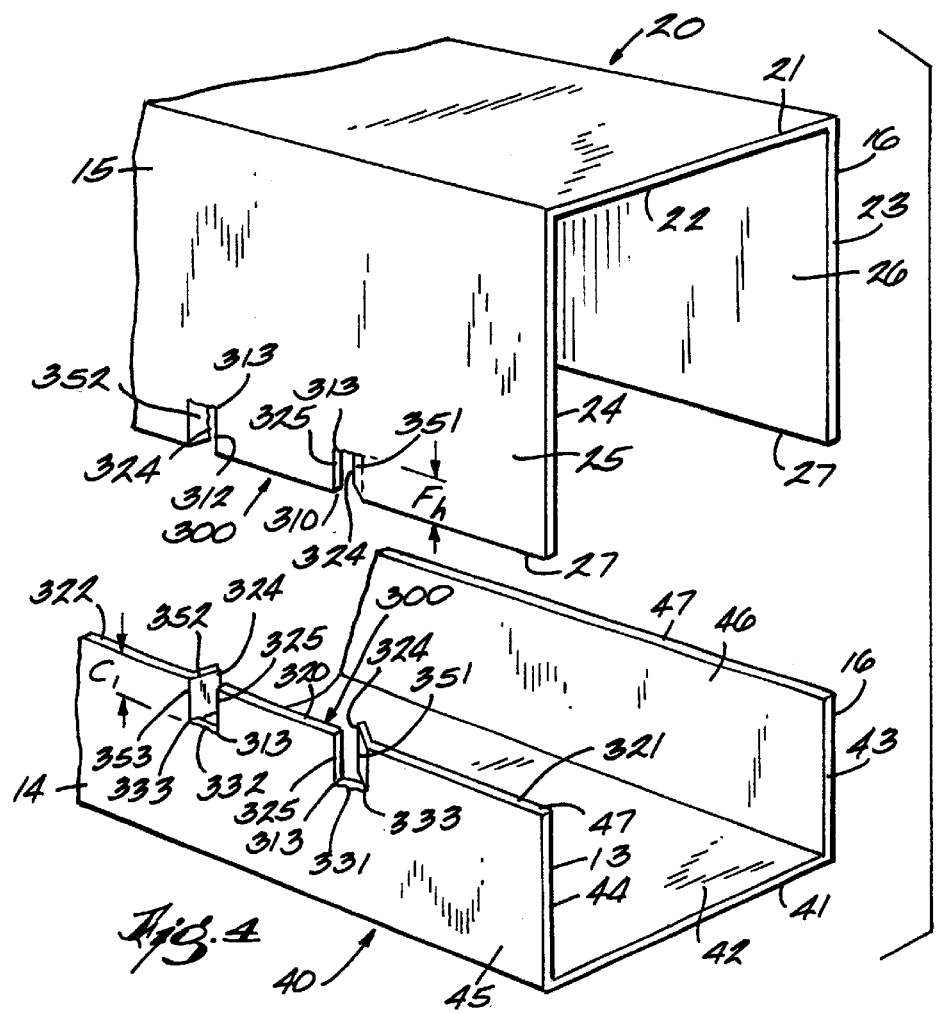
FIG. 4 is a perspective view of the upper and lower channel showing their corresponding slots in proper vertical alignment.

The wall frame 10 includes three types of prefabricated components. These components are upper and lower mounting brackets or channels 20 and 40, and a plurality of support studs 60. As shown in FIG. 4, the upper channel or track 20 is formed by a base 21 and two integral sidewalls 23 and 24. The sidewalls 23 and 24 extend at about a 90° angle from the sides of the base 21 and are roughly parallel to each other to give the channel 20 a generally U-shaped cross-sectional appearance. The base 21 of the channel 20 is positioned horizontally to lay flush against the ceiling 5. The upper channel 20 is firmly anchored to the ceiling 5 by a number of fasteners that grip the inside surface 22 of the base 21 and extend through the base 21 and into the ceiling 5. Each sidewall 23 and 24 is oriented roughly vertically relative to the base 21. Each sidewall 23 and 24 has an outside surface 25, an inside surface 26, and an outer most end 27 relative to the base 21.

The lower channel or track 40 is formed by a base 41 and two integral sidewalls 43 and 44. The sidewalls 43 and 44 extend at about a 90° angle from the sides of the base 41 and are roughly parallel to each other to give the channel a generally U-shaped cross-sectional appearance. The base 41 of the channel 40 is positioned horizontally to lay flush against the floor 6. The lower channel 40 is firmly anchored to the floor 6 by a number of fasteners that grip an inside surface 42 of the base 41 and extend through the base and into the floor. Each sidewall 43 and 44 is oriented roughly vertically relative to the base 41. Each sidewall 43 and 44 has an outside surface 45, an inside suface 46 and an outer most end 47 relative to the base 41.

The upper and lower channels 20 and 40 are preferably fabricated from a sheet metal such as steel, and have a uniform thickness of about 20 or 25 gauge. The upper 20 and lower 40 channels have different heights. The vertical sidewalls 23 and 24 of the upper channel 20 typically have a height of about 2.5 inches. The vertical sidewalls 43 and 44 of the lower channel 40 typically have a height of about 1.25 inches. The sidewalls 23 and 24 of the upper channel 20 are taller that those of the lower channel 40 to accommodate the vertical movement of the upper channel 20 and ceiling 5 relative to the remainder of the wall frame 10 during use. Although the upper and lower mounting brackets 20 and 40 are shown and described as being metal, U-shaped channels, it should be understand that these brackets could be made of other materials such as plastic, take on a variety of shapes, or be formed by two L-shaped members, one placed on the other, without departing from the broad aspects of the invention.

Figure 5:
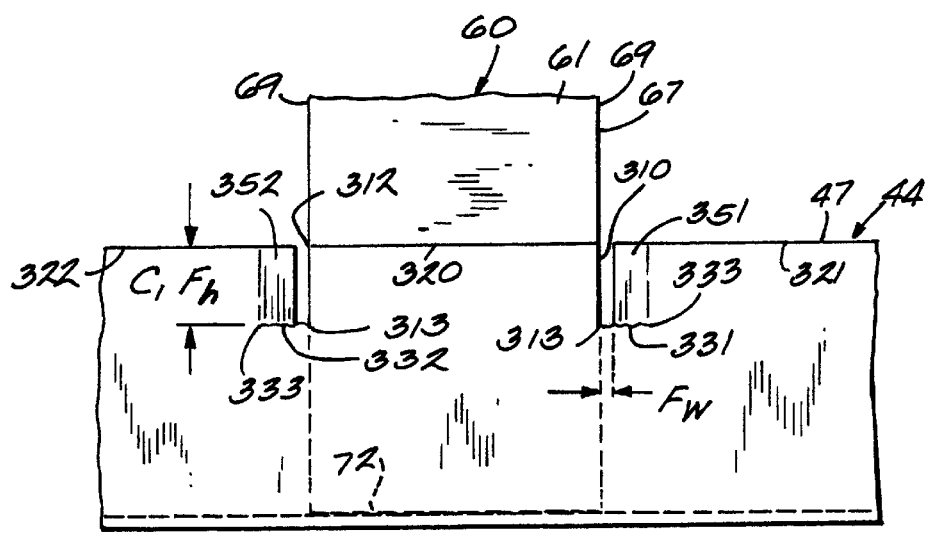
FIG. 5 is a side view of a stud snap fit into a slot formed in the lower channel.
Figure 6:
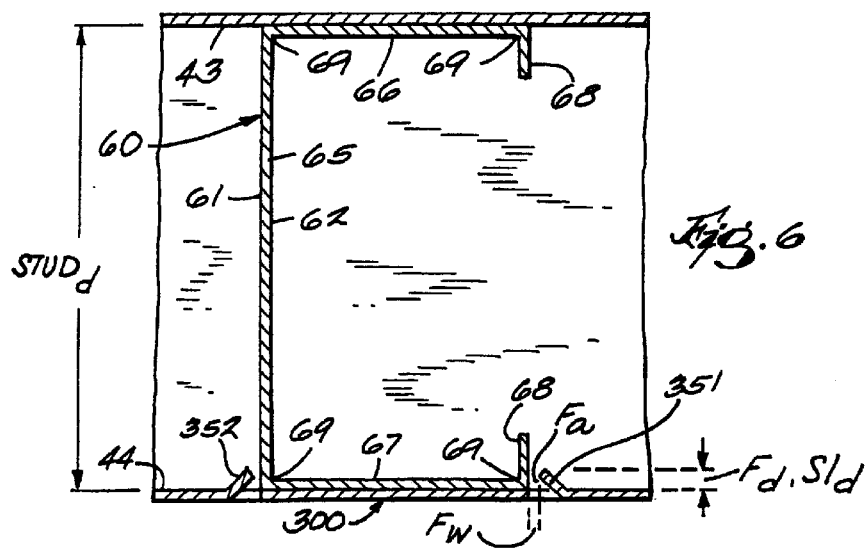
FIG. 6 is a top sectional view of the channel with a square corner stud in place.

As shown in FIGS. 5–7, each stud 60 has a shell-like or generally C-shaped cross-sectional appearance defined by its outside and inside surfaces 61 and 62. Each stud 60 has an intermediate web 65 and two integral side flanges 66 and 67. Each flange 66 and 67 has a major portion that extend at an angle of about 90° from one side of the web 65 so that each flange 66 and 67 is roughly parallel to the other. Each flange 66 and 67 is integrally attached to the web 65 at one end and has an inwardly projecting leg 68 extending from its other end. The web 65, flanges 66 and 67 and legs 68 combine to give the stud 60 its generally C-shaped cross-sectional appearance. The corners 69 of the stud 60 can be relatively square as shown in FIG. 6, or rounded as shown in FIG. 7. The studs are also preferably pre-fabricated from a sheet metal such as steel, and have a uniform thickness of about 20–25 gauge. One of ordinary skill in the art should understand that the C-shaped studs could take on a different shape without departing from the broad aspects of the invention.

The studs 60 are positioned vertically between the upper and lower channels 20 and 40 of the frame 10. The studs 60 are spaced evenly apart down the length of the frame 10. Each stud 60 has a top end 71 that fits into the upper channel 20, and the bottom end 72 that fits into the lower channel 40. The width of the web 65 is sized so that the outside surfaces 61 of the flanges 66 and 67 snuggly engage the sidewalls 23, 24, 43 and 44 of the channels 20 and 40. The major portion of each flange 66 and 67 is parallel to and flushly engages the inside surfaces 26 and 46 of the sidewalls 23, 24, 43 and 44 of the upper and lower channels 20 and 40. As discussed below, during the intermediate stage of constructing the wall frame 10, each stud 60 is held to the upper and lower channels 20 and 40 by a slot 300 that is formed into the sidewalls 23 or 24 and 43 or 44 of the channels.

Figure 10:
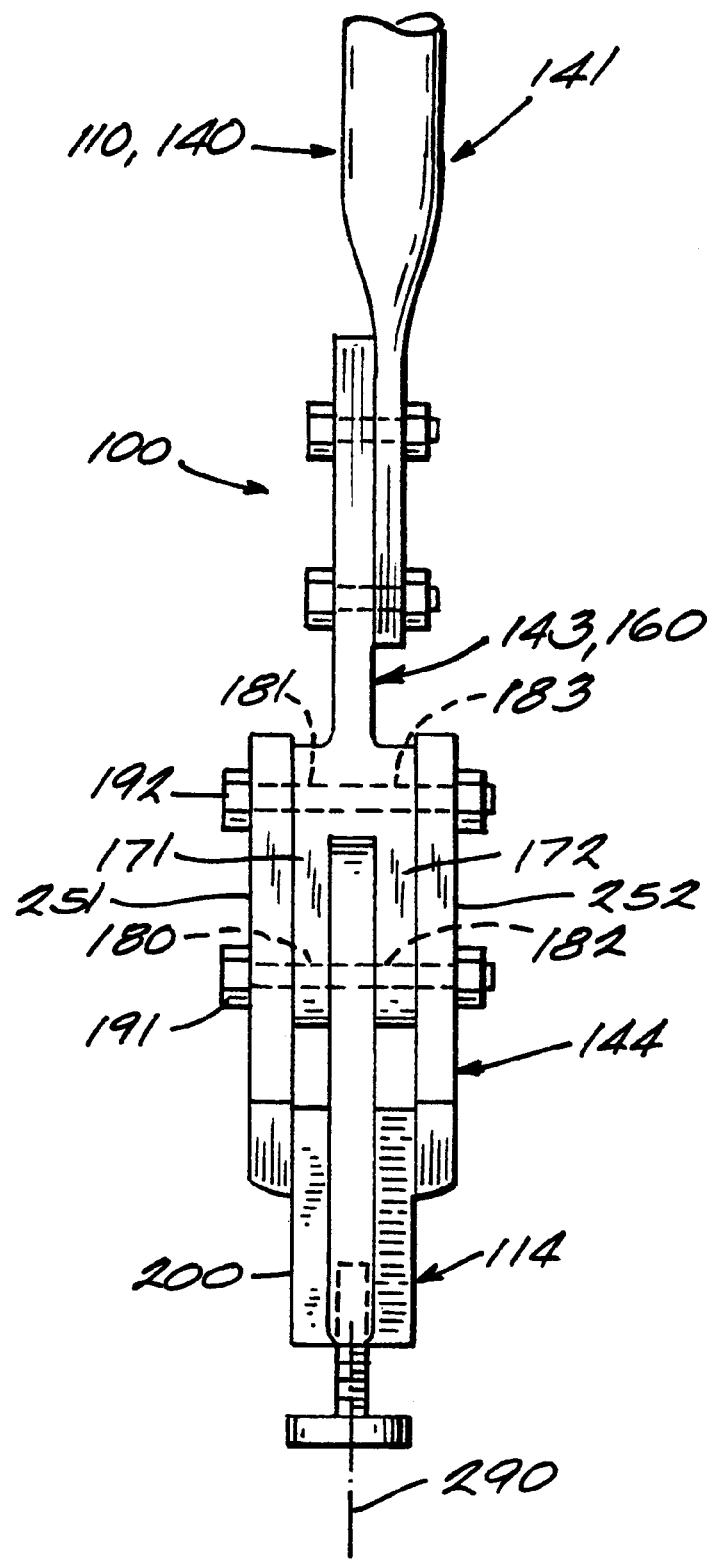
FIG. 10 is a front side view of the slot forming tool showing its symmetrical design.

FIGS. 8–10 show a preferred embodiment of the inventive slot forming tool 100. The tool 100 is formed by a pair of pivotally connected alignment arm 110 and movement arm 140. As discussed below, during the operation of the tool, the alignment arm 110 remains stationary and the movement arm 140 pivots about that stationary arm. Each arm 110 and 140 has an elongated lever portion 111 or 141, an intermediate connecting portion 113 or 143, and a working portion 114 or 144. The working portion 114 of stationary arm 110 includes a cutting block 200. The working end 144 of pivot arm 140 includes a pair of spaced knives 251 and 252. When the pivot arm 140 is drawn toward the stationary arm 110, the knives 251 and 252 shearingly engage the sides of the cutting block 200. The components forming the tool 100 are robustly designed and made from a high strength metal to withstand the forces needed to repeatedly cut and bend the sidewalls 23, 24, 43 and 44 of the metal channels 20 and 40. The blades are made of a metal such as steel that resists wear.

The elongated lever or handle portion 120 and 150 of each arm 110 and 140 includes a preferably lightweight, hollow tube 121 or 151 that is robustly designed to resist bending. The tubes 121 and 151 are about twenty inches long so that a worker can apply a reasonable amount of force at the grips 122 and 152 to generate a sufficiently large amount of force at the working portion 114 and 144 of the tool 100 to cut and bend the metal channels 20 and 40. The length of the tubes 121 and 151 also allows a worker to use the tool 100 to comfortably reach the upper and lower channels 20 and 40. The outer end of each handle portion 120 and 150 has a grip 122 and 152. The grips 122 and 152 are made of plastic or rubber and shaped to enable the worker to firmly grip each arm 110 and 140. The tubes 121 and 151 are bolted or otherwise rigidly attached to intermediate connecting portions 113 and 143, respectively.

The alignment arm 110 includes the intermediate connecting portion 113. This connecting portion 113 includes a bracket 130 formed by an elongated, uniformly thick plate. The bracket 130 is relatively wide through a major portion 131 of its length. The major portion 131 has an arcuate S-shape to allow the arms 110 and 140 to close to a desired position as discussed below. The end of the major portion 131 forms a flat step or landing 132, so that the width of the bracket 130 narrows to form a leg 133 that continues to extend longitudinally with the axis of the arm 110. The opposed side surfaces 134 and 135 of the bracket 130 are generally flat and smooth. A hole 136 is drilled completely through the bracket 130.

The movement arm 140 has the intermediate connecting portion 143. This connecting portion 143 includes a bracket 160 formed by a central plate 161 and two spaced plates or prongs 171 and 1 72 to give the bracket a forked-shape. The central plate 161 is somewhat shorter than the major portion 131 of bracket 130, but has roughly the same thickness and width. The opposed side surfaces 163 and 164 of the central plate 161 are generally flat. One spaced plate or prong 171 or 172 is bolted or otherwise rigidly secured to each side 163 or 164 of the central plate 161. The prongs 171 and 172 extend parallel to and longitudinally from central plate 161. The opposed inside and outside surfaces 173 and 174 of the prongs 171 and 172 are also flat and smooth. A pair of holes 180 and 181 or 182 and 183 are drilled completely through each prong 171 and 172. Holes 180 and 182 are linearly aligned, along with hole 136 on bracket 130, to receive a pivot bolt 191. Holes 181 and 183 are also linearly aligned to receive a fastening bolt 192.

The alignment and movement arms 110 and 140 are pivotally joined by their intermediate connecting portions 113 and 143. The major portion 131 of bracket 130 is inserted between the spaced prongs 171 and 172 of the forked-shaped connecting portion 160. The flat, smooth, opposed surfaces 134 and 135 of bracket 130 are flushly and snuggly received between flat, smooth inside surface 173 of parallel plates 171 and 172. Hole 136 is linearly aligned with holes 180 and 182. These three holes have the same diameter to smoothly receive pivot bolt 191. Each of the intermediate connecting portions 113 and 143 is rigidly connected to its respective working portion 114 or 144 of the tool 100.

The working portion 114 of alignment arm 110 includes a cutting block 200 as shown in FIGS. 8–10. The cutting block 200 is formed from the leg 133 of bracket 130 and two triangular shaped plates 202 and 204. Each plate 202 and 204 is welded or otherwise rigidly secured to one side of the leg 133. The leg 133 and plates 202 and 204 combine to form a flat face 205. The sidewalls 206 and 207 of the cutting block 200 are parallel and extend at right angles to the face 205. The thicker end of each triangular shaped plate is flushly aligned with the step 132 of bracket 130. The face 205 extends parallel to the longitudinal axis of arm 110. The face 205 of the cutting surface is perpendicular to the step 132. The leg 133 and triangular portions 202 and 204 combine to form a flat, T-shaped top end 208 of the cutting block 200. The cutting block 200 has cutting edges 211 and 212 that are formed by the intersection of its flat face 205 and parallel side walls 206 and 207. The cutting edges 211 and 212 are generally parallel to the longitudinal axis of the arm 110 and perpendicular to the step 132 of bracket 130.

Figure 11:
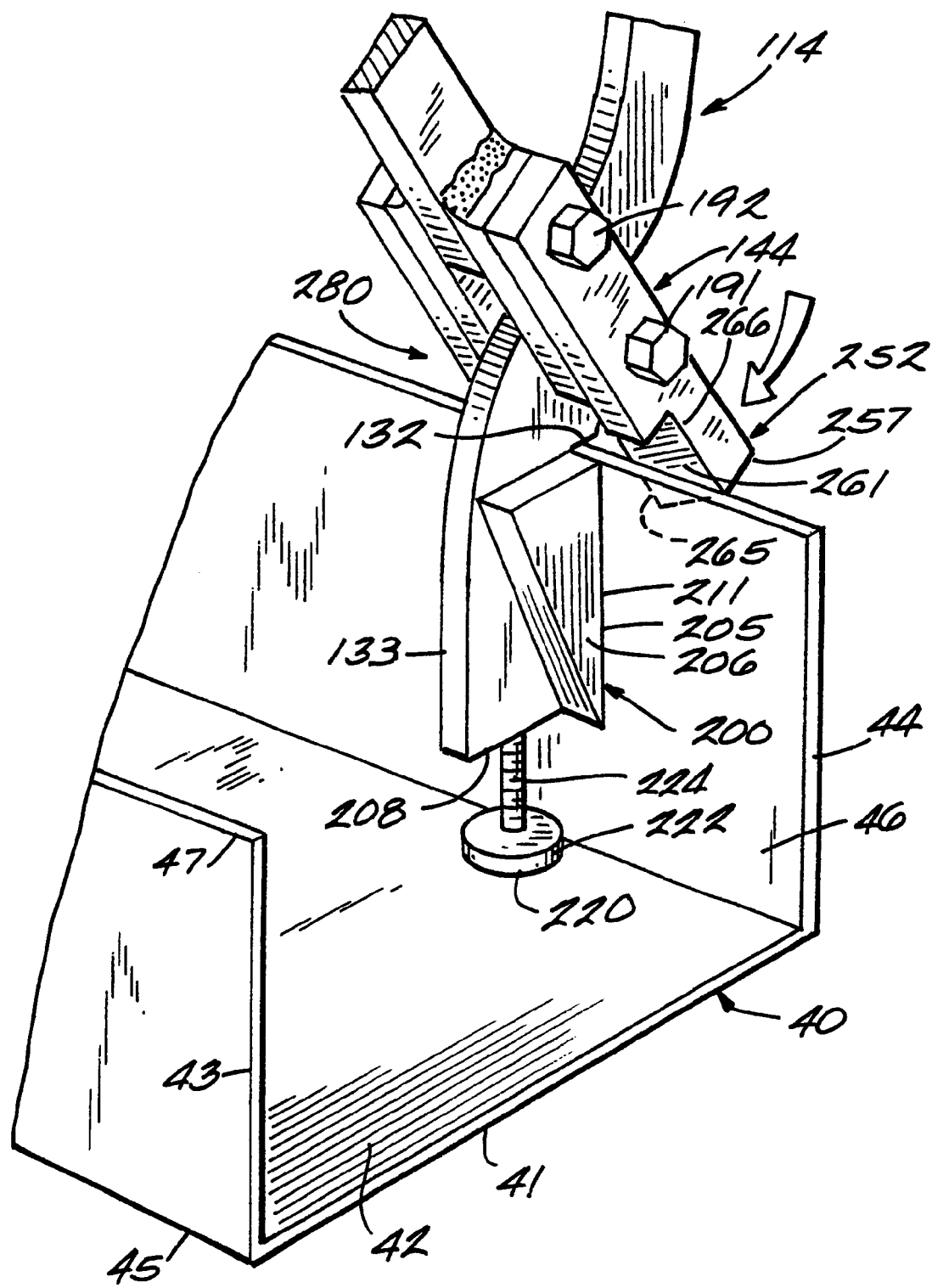
FIG. 11 is a perspective view showing the slot forming tool in its open position with the alignment mechanism engaging a horizontal portion of the channel, the cutting block abutting the inside surface of a vertical wall of the channel and an alignment step abutting the top end of the vertical wall.

The tool 100 includes an alignment mechanism 220 located at the top 208 of the cutting block 200. The alignment mechanism 220 includes a plate 222 that is extended or retracted by rotating it about a threaded blot 224 as shown in FIG. 11. The bolt 224 is firmly received by a hole in the top end 208 of the cutting block 200. By rotating the plate 222 about the bolt 224, the plate can be adjustably extended or retracted to adjust the vertical height or alignment of the working portions 114 and 144 of the tool 100 relative to the sidewalls 23 and 24 of the channel 20. The plate 222 is preferably set so that the alignment step 132 just touches the outermost end 27 of the channel 20. The plate 222 preferably has a non-skid surface to prevent movement of the cutting block when the movement arm 140 is stroked as discussed below. In lieu of the plate 222 and bolt 224, the alignment mechanism 220 could be formed by elongating the T-shaped top end 208 of the cutting block 200 so that the top end directly engages the inside surface 42 of the base 41 of the channel 40. The alignment mechanism 220 eliminates inadvertent pressure by the tool 100 on the outermost end 27 of the channel 20 that could crush or kink its vertical portion 24 when aligning or operating the tool.

The working portion 144 of movement arm 140 includes two spaced knives 251 and 252. Each knife 251 and 252 is formed by a relatively thick, elongated plate with a main body 253. Each knife 251 and 252 has leading and trailing sidewalls 254 and 255, inner and outer ends 256 and 257, and inner and outer surfaces 258 and 259. The thickness of the plate is about ⅜ of an inch. As discussed below, the knives 251 and 252 are removable for easy replacement.

Each knife 251 and 252 has a wedge or ramp shaped blade 261 formed into it proximal outer end 257. Each blade 261 has a flat, angled surface 262 that extends from the inner surface 258 to the outer surface 259 of the knife 251 or 252. The angled surface 262 meets the inner surface 258 at the leading sidewall 254 of the knife 251 or 252 to form a relatively sharp cutting edge 265. The outer end 266 of flat angled surface 262 meets the outer surface 259 of the main body 253 along a line toward the middle of the outer surface 259 of the main body 253. The blade 261 and cutting edge 265 have a length $B_1$ of about ⅝ of an inch. The angle of the surface 262 of each blade 261 is uniform across the length the blade $B_1$, and preferably forms an angle of about 45° with the inner and outer surfaces 258 and 259 of the knife 251 or 252. However, it is believed that this angle could be increased or decreased without departing from the broad aspect of the invention.

As best shown in FIG. 9, the inner surface 258 of the main body 253 of knife 251 or 252 is flushly positioned against the outer surface 174 of plate 171 or 172 of connector 160 with the angled side 262 of the blade 261 facing out. The main body 253 of each knife 251 and 252 includes a pair of spaced holes 270 and 272 that are aligned with holes 180, 181, 182 and 183 of plates 171 and 172. The knives 251 and 252 are removably and rigidly secured to their respective plate 171 and 172 by pivot bolt 191 and fastening bolt 192. The blades 261 extend from the end of each plate 171 and 172. Different sets of knives 251 and 252 can be easily installed should the cutting edges 265 of the blades 261 become dull or a different knife thickness be desired.

Figure 12A:
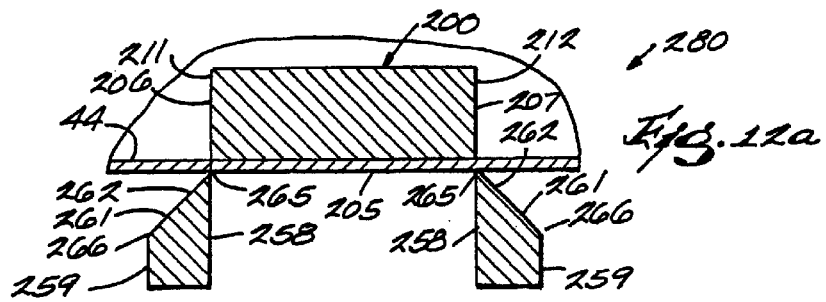
FIG. 12a is a top sectional view of FIG. 12.
Figure 13A:
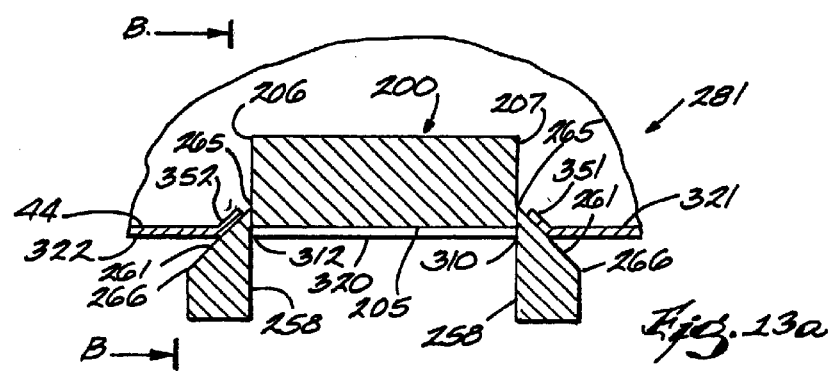
FIG. 13a is a top sectional view of FIG. 13.
Figure 14A:
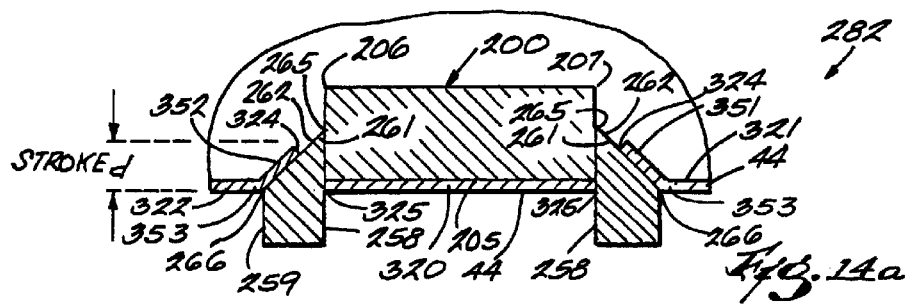
FIG. 14a is a top sectional view of FIG. 14.

The working portions 114 and 144 form a pair of jaws that pivot about a bolt or pivot point 191 and move from an open position 280, through an intermediate position 281, and to a closed position 282. When the arms 110 and 140 are in their open position 280, the cutting edge 265 of each knife 251 and 252 face the cutting block 200 as shown in FIGS. 11, 12 and 12a. The knives 251 and 252 are positioned and shaped so that the flat, inner surface 258 of each knife 251 and 252 and blade 261 is flush with or in roughly the same plane as the corresponding flat, sidewalls 206 or 207 of the cutting block 200. When the arms 110 and 140 are drawn together to make a cut, the cutting edge 265 of each blade 261 simultaneously shearingly engage the face 205 of the cutting block. The inner surface 258 of each blade 261 then slides across the sidewalls 206 or 207 of the cutting block 200 until the tool 100 reaches the intermediate position 281, as shown in FIGS. 13 and 13a. In the closed position 282, the cutting edges 265 of each blade 261 extend below and are roughly parallel to the face 205 of the cutting block 200 as shown in FIGS. 14 and 14a. The cutting edges 265 stop at a stroke depth, Stroked, about ½ of an inch below the face 205 of the cutting block 200. The outer end 266 of the ramp shaped blade 261 is aligned roughly even with and parallel to the face 205 of the cutting block 200. The closed position 282 is determined by a stop 283 where the sidewall of the connector 160 abuts the sidewall of connector 130. The stop 283 ensures that the same stroke depth, Stroked, and parallel orientation between the cutting edges 265 and ramp top 266 with the face 205 of the cutting block 200 are obtained for each complete stroke of the arms 110 and 140.

The tool 100 has a generally symmetrical design. A line of symmetry or centerline 290 passes through the middle of the tool 100 and its arms 110 and 140 when viewed from the side as shown in FIG. 10. The forces applied by the user to the handle grips 122 and 152 are in a plane parallel to and equadistantly from the shear planes formed by the sidewalls 206 and 207 of the cutting block 200 and the inside surfaces 258 of the knives 251 and 252. This symmetrical design enables the tool 100 to make two simultaneous cuts, tears and bends in the channel without twisting in the hands of the person using the tool.

Operation of Tool

The slot forming tool 100 forms a complete slot 300 in a single stroke of the tool. The tool 100 simultaneously cuts two parallel vertical slits 310 and 312 in the vertical wall 23, 24, 43 or 44 of the U-shaped channels 20 or 40, and then rips or peals two perpendicular brakes or tears to form two flaps 351 and 352, and inwardly bends those flaps. The two flaps 351 and 352 form the slot 300 that aligns and slidingly engages one of the studs 60 during the intermediate stage of construction of the wall frame 10. Although the tool 100 can be used to form slots 300 in either or both the upper and lower channels 20 and 40 and can be used to form slots in either or both the vertical sidewalls 23, 24, 43 or 44 for the sake of brevity we will discuss the formation of slots in the outer sidewall 44 of the lower channel 40. It should also be noted that slots 300 can be formed in both the upper and lower channels 20 and 40, or only the upper channel.

The tool 100 is first aligned with the channel 40 as shown in FIGS. 11 and 12. The length or center line 290 of the tool 100 is oriented vertically, and the tool is positioned at a location where the channel 40 will receive one of the studs 60. The line of symmetry 290 of the tool 100 is aligned with what will be the longitudinal centerline of the stud 60 when the stud is positioned at its desired location in the channel 40. The arms 110 and 140 are spread apart so that the tool 100 is in its open position 280 as shown in FIG. 8. The cutting block 200 and knives 251 and 252, which form the jaws of the tool, are now spread apart to receive one of the vertical sections 44 of the channel 40. The jaws of the tool 100 are then positioned around the vertical portion 44. The tool 100 is set in place so that the face 205 of the cutting block 200 flushly engages the inside surface 46 of the vertical section 44 of the channel 40. The knives 251 and 252 are positioned on the outside surface 45 of the channel 40. The tool 100 is then oriented vertically relative to the vertical portion 44 of the channel 40 by adjusting the plate 222 and bolt 224 so that the flat alignment step 132 just engages the top end 47 of the channel 40 as shown in FIG. 11. The distance between the step 132 and the top end 257 of the knives 251 and 252 determines the length of the cut, $C_1$, of the slits 310 and 312.

Once the alignment arm 110 is properly aligned and set in place, the movement arm 140 is ready to be stroked to form a slot 300 in the vertical portion 44 of the channel 40 as shown in FIGS. 13 and 14. The tool 100 is stroked by moving the movement arm 140 from its open position 280, through its intermediate position 281 and to its closed position 282. The stroke is divided into two different portions. During a first portion of the stroke, the tool 100 simultaneously cuts two parallel slits 310 and 312 laterally into the vertical portion 44 of the channel 40, as shown in FIGS. 13 and 13a. During a second portion of the stroke, the tool proceeds to rip two longitudinal tears 331 and 332 in the vertical portion 44 as shown in FIGS. 14 and 14a. The first portion ends and second portion begins when the arms 110 and 140 are in their intermediate position 281. Although the tool 100 is described as cutting slits 310 and 312 and ripping or pealing tears 331 and 332, it should be understood that the slits and tears could be formed by a punch out, and the tears could be slits or brakes in the channel, formed by cutting, braking or otherwise separating the channel into segments.

During the cutting portion of the stroke, the tool 100 cuts two parallel, spaced apart slits 310 and 312 into the vertical sidewall 44 of the channel 40 as shown in FIGS. 13 and 13a. The cutting edges 265 of the blades 261 start by shearingly engaging the top end 47 of the vertical wall 44 and cut the slits 310 and 312 laterally down the vertical section of the channel 40. The slits 310 and 312 are formed in the vertical section 44 starting from the top 47 of the vertical section 44 to an end point 313. The end point 313 is where the outer end 257 of the knife 251 or 252 shearingly engages the vertical section 44. The distance between the top 47 of the vertical section 44 to this end point 313 is the cut length $C_1$ of the slit 310 and 312. When the tool 100 is aligned as shown in FIGS. 12–14, the cut length $C_1$ can be the same as the distance the outer end 257 of the blades 261 extend beyond the alignment step 132. The two slits 310 and 312 divide the vertical section 44 into three segments 320, 321 and 322. The middle segment 320 is the portion of the vertical section 44 that is bounded by the slits 310 and 312. The first outer segment 321 is the portion of the vertical section 44 opposite slit 310 from the middle segment 320. The second outer segment 322 is the portion of the vertical section 44 opposite slit 312 from the middle segment 320.

The tearing portion of the stroke begins where the cutting portion stops. This is the intermediate position 281 of the tool 100. After the cutting edge 265 of the blade 261 cuts through to the end point 313, the cutting edge 265 continues to travel along the sidewalls 206 and 207 of the cutting block 200 as shown in FIGS. 14 and 14a. The angled surface 262 of the blade 261 forms a ramp that rips or otherwise pulls the vertical wall 44 apart. Each tear 331 and 332 starts at the end point 313 of their respective slit 310 and 312. The inside surface 46 of the middle segment 320 of the vertical portion 44 remains flush with the face 205 of the cutting block 200, but the outer surface 45 of the outer segments 321 and 322 are forced to travel or ride up the angled surface 262 of the blade 261. The sidewall 44 begins to tear when the material exceeds its ability to stretch to accommodate the wedge effect of the ramp shaped blades 261.

The continued movement of the blades 261 through the tear portion of the stroke peals or rips the longitudinal brakes or tears 331 and 332 into the vertical portion 44 of the channel 40. The brakes 331 and 332 propagate outwardly from the end point 313 of the slits 310 and 312 and into the outer segments 321 and 322, because the blades 261 face outwardly from each other. The brakes 331 and 332 are roughly linear and perpendicular to the slits 310 and 312 because the end wall 257 of each knife 251 and 252 is flat and perpendicular to the cutting edge 265 of the blades 261.

and because the end wall 257 of the knives 251 and 252 travels in a roughly linear path parallel to the outer end 47 of the vertical portion 44 of the channel 40 through the tearing portion of the stroke.

The tearing portion of the stroke continues until the stroke is complete and the movement arm 110 reaches the stop point 283 against alignment arm 110 and the tool 100 is in its closed position 282 as shown in FIGS. 14 and 14a. The cutting edges 265 and upper end 266 of the ramp shaped blades 261 are now roughly parallel to the face 205 of the cutting block 200, and the upper end 266 of the angled surface 262 is roughly even with the face 205 of the cutting block 200. Once the stroke is completed, the tears 331 and 332 are torn to a desired length $T_1$. The tear length $T_1$ is roughly equal to the stroke depth, Stroked, of the blades 261.

The tool 100 deforms the outer segments 321 and 322 by bending them inwardly as shown in FIGS. 13, 13a, 14 and 14a. A portion of the bending occurs during the cutting portion of the stroke. The top end 47 of each outer segment 321 and 322 proximal its respective slit 310 and 312 begins to ride up the angled surface 262 of the blade 261 as shown in FIGS. 13 and 13a. The deformed portions or flaps 351 and 352 of the outer segments 321 and 322 have a triangular shape when the cutting portion of the stroke is complete.

The bending of the outer segments 321 and 322 continues during the tearing portion of the stroke. As the blade continues to pivot and travel along the sidewalls 206 and 207 of the cutting block 200, the entire cut end 324 of each outer segment 321 and 322 rides up the angled surface 262 of the blade 261 as shown in FIGS. 14 and 14a. The deformed portions or flaps 351 and 352 of the outer segments 321 and 322 have a rectangular shape when the tearing portion of the stroke is complete.

The exact geometry of the flaps 351 and 352 will vary based on a variety of factors. The flap may remain flat for some types of materials or gauges of channel thickness, or the flaps may curl for other types of materials or gauges. The position of the cutting edge 265 of the blade 261 relative the face 205 of the cutting block 200 when the stroke is complete and the tool 100 is in its closed position also affect the geometry of the flaps 351 and 352. When the cutting edge 265 is parallel to the face 205 of the cutting block 200 in the closed position 282, the flaps 351 and 352 take on a generally rectangular shape as shown in FIGS. 15 and 16. When the cutting edge 265 is angled so that is does not achieve a parallel orientation to the face 205 of the cutting block 200 in the closed position 282, tearing may not occur during the tear portion of the stroke. The thickness and characteristics of the material forming the channel 40 may also prevent tearing during the tear portion of the stroke. In these situations, the flaps 361 and 362 can take on a generally triangular shape as shown in FIGS. 17 and 18. Although the flaps are shown and described as having no tear to produce triangular shaped flaps 361 and 362 or a complete tear 331 and 332 to produce rectangular shaped flaps 351 and 352, it should be understood that the tears could be partial tears to produce flaps with a different shape.

Slot and Flap Geometry

As shown in FIGS. 4–7, 15 and 16, each slot 300 has two slits 310 and 312. Each slit 310 and 312 starts at the outer end 47 of the vertical portion 23, 24, 43 or 44 of the channel 20 or 40 and extends linearly and vertically down to an end point 313. The slits 310 and 312 are cut to a consistent desired length $C_l$. The two slits 310 and 312 divide the vertical portion 44 into three sections 320, 321 and 322.

Longitudinal tears 331 and 332 are formed in the outer segments 321 and 322. Each tear 331 and 332 starts from the end point 13 of the slits 310 and 312 and extends generally linearly and horizontally down the length of the channel 20 or 40 to an end point 333. The tears 331 and 332 are torn to a consistent tear length $T_1$. Each slit 310 and 312 and its corresponding tear 331 and 332 defines the height $F_h$ and width $F_w$ of one flap 351 or 352. The height $F_h$ and width $F_w$ of each flap 351 or 352 are consistently substantially the same as the other flaps 351 or 352 formed.

When the tool 100 is set up to form generally rectangular shaped flaps 351 and 352, the flaps are bent inwardly along a generally vertical line or region 353 that passes through the end point 333 of the tear 331 or 332, as shown in FIGS. 15 and 16. Each flap 351 or 352 is consistently bent to a desired angle $F_a$ along this line 353. Bend angle $F_a$ is uniform through the height $F_h$ of the flap 351 and 352 The bend angle $F_a$ is generally the same angle as the angled surface 262 of the blades 261 The flap width $F_w$ and bend angle $F_a$ determine the amount of offset or depth $F_d$ of each flap 351 and 352. The flap depth $F_d$ is the distance the outer edge 324 of the flap 351 or 352 extends into the channel 20 or 40. the cut edge 324 of the rectangular flaps 351 and 352 are generally parallel to the cut edges 325 of the middle segment 320.

When the tool 100 and channel material and thickness or gauge is set up to prevent tearing and form generally triangular shaped flaps 361 and 362, the flaps are bent inwardly along an angled line or region 363 starting at end point 313 of the slit 310 or 312, as shown in FIGS. 17 and 18. Each flap 361 or 36 is consistently bent to a desired angle $F_a$ along this angled line 363. Bend angle $F_a$ uniform through the height $F_h$ of the flap 361 and 362. The flap width $F_w$ and bend angle $F_a$ determine the amount of offset or depth $F_d$ of each flap 361 and 362. The flap depth $F_d$ is roughly the distance the outer tip 364 of the flap 361 or 362 extends into the channel 20 or 40. The cut edge 324 of the triangular flaps 361 and 362 angles away from the cut edge 325 of the middle segment 320.

Each slot 300 is formed by two opposed inwardly bent flaps 351 and 352 or 361 and 362. By consistently forming the slits 310 and 312 and tears 331 and 332 to a desired length $C_1$ and $T_1$, locating the bend at a desired location, and bending the flaps 351 and 352 to a desired angle $F_a$ and desired depth $F_d$, the tool 100 is able to consistently form a slot 300 having a desired size and shape. Each slot 300 is consistantly formed to a desired width $Sl_w$ and depth $Sl_d$ or flap depth $F_d$. The slot width $Sl_w$ is slightly larger than the distance between the slits 310 and 312 due to the bending of the flaps 351 and 352 or 361 and 362.

Snap-Fit of Studs in Slots

Each stud 60 is snap-fit into its corresponding slot 300 in the upper channel 20. This snap-fit is accomplished by aligning the top end 71 of the stud 60 with its corresponding slot 300, and twisting the stud about its longitudinal axis. The flaps 351 and 352 or 361 and 362 have a depth $F_d$ that normally prevents the insertion of the stud into the slot 300. The twisting of the stud 60 reduces its depth, Studd, to enable the stud to clear the flaps 351 and 352 or 361 and 362. When an accompanying slot 300 is formed into the lower channel 40 as shown in FIG. 4, the slots 300 are aligned directly over or under each other. The bottom end 72 of the stud 60 is then snap-fit into the slot 300 of the lower channel 40. Once in place in the slots 300, the cut end 324 of flap 351 or 361 is aligned to engage the leg 68 of the stud 60, and the cut end 324 of flap 352 or 362 is aligned to engage the web 65 of the stud 60. The Slot depth $Sl_d$ or depth of the flaps $F_d$ is particularly critical when the studs 60 have rounded corners as shown in FIG. 7. The cut end 324 or tip 364 of the flaps 351, 352, 361 or 362 should extend above the rounded corner and align with the flat portion of the leg 68 and web 65 to help ensure that the stud 60 does not get bumped out or fall out The width $Sl_w$ of the slots 300 is preferably an ⅛ of an inch wider than the width $Stud_w$ of the studs 60. This ⅛ inch clearance allows the studs 60 to easily snap-fit in place. If the engagement is not tight enough then the stud 60 will not be securely held in place. If the abutment is too tight, then the stud 60 cannot snap into the slot 300. The ⅛ inch clearance also prevents the flaps in the upper channel 20 from pressing against and possibly binding with the stud 60 and inhibiting the movement of the upper channel relative to the studs. A consistent working snap-fit should be achieved by the tool 100 for each of the hundreds of studs 60 in the wall frames 10 throughout a building because the tool is able to produce slots 300 having a consistent desired size and shape.

While the invention has been described with reference to a preferred embodiment, it will be understood by those skilled in the art that various changes may be made and equivalents may be substituted without departing from the broader aspects of the invention.

I claim:

1. A slot forming tool for constructing a wall frame having a mounting bracket and a stud, the mounting bracket having a sidewall and the stud having a predetermined width, the stud being adapted to slidingly engage the surface of the mounting bracket, said slot forming tool comprising:

a first member having a cutting portion and a coupling portion, said cutting portion having first and second spaced apart cutting edges;

a second member having a cutting portion and a coupling portion, said coupling portions movingly connecting said first and second members to allow said tool to be stroked along a path of travel between open and closed positions, said cutting portions being spaced apart in said open position to receive the sidewall of the mounting bracket, said cutting portion of said second member having spaced apart first and second ramped blades, each of said ramped blades having a cutting edge and an angled surface, said angled surface having a predetermined length and being angled to said path of travel, said cutting edge of said first blade being adapted to flushly engage said first cutting edge of said first member and said cutting edge of said second blade being adapted to flushly engage said second cutting edge of said first member;

an alignment mechanism having a spaced abutment adapted to engage one of either the sidewall or the mounting bracket and is spaced from said cutting edges, said alignment mechanism aligning said cutting portions with the sidewall of the mounting bracket; and, wherein stroking said tool from said open position to said closed position causes said ramped blades to engage and form opposed, spaced flaps into the sidewall of the mounting bracket, each spaced flap being bent to a desired orientation to form a slot having a predetermined width and depth to slidingly receive the stud.

2. The slot forming tool of claim 1, and wherein said ramped blades form two spaced apart slits in the sidewall of the mounting bracket, said slits dividing the sidewall into a middle and outer segments, said ramped blades bending said outer segments to form said opposed, spaced flaps.

3. The slot forming tool of claim 2, and wherein said ramped blades form two breaks in each of said outer segments, each of said breaks intersecting one of said spaced apart slits to define one of said flap.

4. The slot forming tool of claim 3, and wherein said ramped blades cut the sidewall of the mounting bracket to form said spaced slits, and tear the sidewall to form said breaks.

5. The slot forming tool of claim 4, and wherein each stroke of said tool simultaneously cuts said two spaced apart slits, simultaneously tears said outer segments, and simultaneously bends said flaps to form said slot.

6. The slot forming tool of claim 5, and wherein the tears emanate from an end point of said slits.

7. The slot forming tool of claim 6, and wherein said stroke includes an intermediate position, said slits being, cut between said open position and said intermediate position, and said tears being formed between said intermediate position and said closed position.

8. The slot forming tool of claim 1, and wherein the stud has lateral walls aligned substantially perpendicular to the sidewall of the bracket, and each of said flaps of said slot maintains the lateral alignment of the stud by abuttingly engaging one of the lateral walls of the stud.

9. The slot forming tool of claim 1, and wherein each of said ramped blades has a top end, and said alignment mechanism aligns said top end of said blades a predetermined distance from the outermost end of the sidewall of the mounting bracket when in said closed position, and each slit is cut to a predetermined length.

10. The slot forming tool of claim 9, and wherein said first member is an alignment member and said second member is a movement member, said alignment member remaining stationary with respect to the mounting bracket and said movement member being stroked along said path of travel between said open and closed positions.

11. The slot forming tool of claim 10, and wherein the mounting bracket includes a perpendicular portion to the sidewall, and said abutment portion of said alignment mechanism engages the perpendicular portion of the mounting bracket to align said top ends of said blades with the outermost end of the mounting bracket.

12. The slot forming tool of claim 11, and wherein said cutting portion of said first member includes a cutting block, said spacing bracket being secured to said cutting block, and said spacing bracket is adjustable to selectively increase and decrease said alignment of said top ends of said blades with the outermost end of the mounting bracket to selectively increase and decrease said length of said slits.

13. The slot forming tool of claim 12, and wherein said alignment mechanism includes an alignment step on said alignment member to abuttingly engage the outermost end of the sidewall of the mounting bracket.

14. The slot forming tool of claim 11, and wherein the mounting bracket is a U-shaped channel with an inside and an outside, and said flaps are bent inwardly into said channel and said slot is formed on said inside of said channel.

15. The slot forming tool of claim 12, and wherein said alignment member has a handle portion with a grip and said movement member has a handle with a grip.

16. The slot forming tool of claim 15, and wherein said alignment member and said movement member are pivotally connected at a pivot point and said first ramped blade is adapted to shearingly engage said first cutting edge of said alignment member and said cutting edge of said second blade is adapted to shearingly engage said second cutting edge of said alignment member.

17. The slot forming tool of claim 16, and wherein said pivot point is intermediate said cutting portions and handle portions.

18. The slot forming tool of claim 17, and wherein said coupling portion of said alignment member includes a plate having side surfaces and a predetermined thickness, and said coupling portion of said movement member includes a forked-shaped connector with two spaced prongs that flushly slide along said surfaces of said plate when said movement member is stroked between said open and closed positions.

19. The slot forming tool of claim 10, and wherein said cutting portion of said alignment member includes a cutting block with a face and opposed side surfaces, said each opposed side surface combining with said face to form a cutting edge spanning each side of said face.

20. The slot forming tool of claim 19, and wherein said ramped blades have a substantially flat inner surface, and said inner surface is substantially parallel to said path of travel of said movement member.

21. The slot forming tool of claim 20, and wherein each of said angled surfaces of said blades are flat, and said angled and inner surfaces form an angle of 45 degrees.

22. The slot forming tool of claim 18, and wherein said angled surface of each of said blades has an outer end, and said outer end is substantially parallel to said face of said cutting block when said tool is in said closed position.

23. The slot forming tool of claim 22 and wherein each flap has a substantially rectangular shape.

24. The slot forming tool of claim 1, and wherein each flap has a substantially triangular shape.

25. The slot forming tool of claim 18, and wherein said face of said cutting block has a predetermined width and said width of said slot is slightly larger than said width of the stud to allow the stud to be snap-fit into said slot.

26. The slot forming tool of claim 18 and wherein said face of said cutting block is adapted to flushly engage the sidewall of the mounting bracket when said movement member is stroked.

27. The slot forming tool of claim 26, and wherein said opposed side surfaces of said cutting block are perpendicular to said face of said cutting block.

28. The slot forming tool of claim 18, and wherein each of said blades is removably secured to one of said prongs of said moving member.

29. A slot forming tool for constructing a wall frame having a mounting bracket and a stud, the mounting bracket having a sidewall and the stud having a predetermined width, the stud being adapted to slidingly engage the surface of the mounting bracket, said slot forming tool comprising:

a first member having a cutting portion and a coupling portion, said cutting portion having first and second spaced apart cutting edges;

a second member having a cutting portion and a coupling portion, said coupling portions movingly connecting said first and second members to allow said tool to be stroked along a path of travel between open and closed positions, said cutting portions being spaced apart in said open position to receive the sidewall of the mounting bracket, said cutting portion of said second member having spaced apart first and second ramped blades, each of said ramped blades having a cutting edge and an angled surface, said angled surface having a predetermined length and being angled to said path of travel, said cutting edge of said first blade being adapted to flushly engage said first cutting edge of said first member and said cutting edge of said second blade being adapted to flushly engage said second cutting edge of said first member;

an alignment step adapted to engage the sidewall of the mounting bracket, said blades extending beyond said alignment step, and said alignment step aligning said cutting portions with the sidewall of the mounting bracket; and, wherein stroking said tool from said open position to said closed position causes said ramped blades to engage and form opposed, spaced flaps into the sidewall of the mounting bracket, each spaced flap being bent to a desired orientation to form a slot having a predetermined width and depth to slidingly receive the stud.

\* \* \* \* \*